US012743808B1

(12) United States Patent
Meiners et al.

(10) Patent No.: US 12,743,808 B1

(45) Date of Patent: Sep. 22, 2026

(54) SIZE AND POSITION ESTIMATION DETERMINATION OF 3D OBJECTS

(71) Applicant: Apple Inc., Cupertino, CA (US)

(72) Inventors: Justin A. Meiners, Boulder, CO (US); Brendan A. McCarthy, San Francisco, CA (US); Gregory D. Chu, Sunnyvale, CA (US); Joshua R. Ford, San Francisco, CA (US); Pavel V. Dudrenov, San Francisco, CA (US); Edwin Iskandar, San Jose, CA (US)

(73) Assignee: Apple Inc., Cupertino, CA (US)

(*) Notice: Subject to any disclaimer, the term of this patent is extended or adjusted under 35 U.S.C. 154(b) by 262 days.

(21) Appl. No.: 18/743,459

(22) Filed: Jun. 14, 2024

Related U.S. Application Data

(60) Provisional application No. 63/521,832, filed on Jun. 19, 2023.

(51) Int. Cl.

| | |
|---|---|
| ***G06T 7/70*** | (2017.01) |
| ***G06T 7/20*** | (2017.01) |
| ***G06T 7/62*** | (2017.01) |
| ***G06T 17/00*** | (2006.01) |

(52) U.S. Cl.
CPC .................. *G06T 7/70* (2017.01); *G06T 7/20* (2013.01); *G06T 7/62* (2017.01); *G06T 17/00* (2013.01)

(58) Field of Classification Search
CPC .... G06T 7/70; G06T 7/62; G06T 7/20; G06T 17/00
See application file for complete search history.

(56) References Cited

U.S. PATENT DOCUMENTS

| | | | | |
|---|---|---|---|---|
| 8,681,255 | B2 | 3/2014 | Katz et al. | |
| 9,091,536 | B2 | 7/2015 | Hausler | |
| 2003/0012410 | A1 | 1/2003 | Navab et al. | |
| 2015/0117716 | A1* | 4/2015 | Ursin | G01V 1/3835 382/106 |
| 2015/0324636 | A1* | 11/2015 | Bentley | A63F 13/212 386/227 |
| 2022/0122289 | A1* | 4/2022 | Shang | G06T 17/00 |

* cited by examiner

*Primary Examiner* — David F Dunphy
(74) *Attorney, Agent, or Firm* — Thompson Hine LLP

(57) ABSTRACT

Various implementations of the systems, methods, and electronic devices described herein estimate three-dimensional (3D) size and position of objects. An example process may include obtaining sensor data for a sequence of frames, determining a representation of an object, and determining 3D positions and size estimates. For each frame that includes image data and depth data, the 3D position is determined based on the device pose data and the depth data for each corresponding frame, and the size estimate is determined based on the image data and the depth data. For each frame of the sequence of frames that includes image data and excludes depth data, the size estimate is determined based on a prior size estimate from a prior frame, and the 3D position is determined based on the size estimate of the representation of the object and a portion of the image data.

20 Claims, 7 Drawing Sheets

100
185
104
110
125
102

SIZE AND POSITION ESTIMATION DETERMINATION OF 3D OBJECTS

CROSS-REFERENCE TO RELATED APPLICATION

This application claims the benefit of U.S. Provisional Application Ser. No. 63/521,832 filed Jun. 19, 2023, which is incorporated herein in its entirety.

TECHNICAL FIELD

The present disclosure generally relates to systems, methods, and electronic devices for estimating size and position of an object in a three-dimensional environment.

BACKGROUND

Existing systems and techniques may be improved with respect to assessing and using sensor data to estimate accurate size and position dimensions of planar objects in three-dimensional space and/or three-dimensional objects in a physical environment.

SUMMARY

Various implementations disclosed herein include devices, systems, and methods that provide and augment an extended reality (XR) environment based on estimating the three-dimensional (3D) size and position of objects in the physical environment while providing a view of the XR environment. The object may be a planar object in three-dimensional (3D) space or a 3D object and the object may be a physical object in a real environment.

In some implementations, the object's 3D position and size may be determined based on a depth sensor signal that provides distance-to-object information, an image sensor signal that provides images interpreted (e.g., by a machine learning model) to identify image portions corresponding to the object, and a head/device pose signal. For frames for which both depth and image data is available, the object's 3D position may be determined from the device's current pose and sensor/camera calibration, and the distance-to-object/depth sensor values, and the object's size is determined based on identifying an image portion corresponding to the object and the distance-to-object/depth sensor values. For frames for which depth data is not available but image data is available (e.g., where the image and/or machine learning model is 10 hz and depth estimates are 1 hz, depth estimates are not available for 9 of 10 image/machine learning frames), the object's size is determined based on one or more prior size estimates (e.g., previously determined when a depth estimate was available), and the object's 3D position is determined based on object size and based on identifying the image portion corresponding to the object. Thus, apparent size is used as a proxy for depth during intermediate periods/frames for which depth sensor data is not available. Depth may be solved based on the relationship between object size and image size determined by a pinhole camera model. The framework can also detect/correct inaccurate sensor depth readings.

In some implementations, the object's 3D position and size may be determined based on a combination and/or sequence of filters to achieve particularly desirable results. In an exemplary implementation, one method may include filtering depth, using the filtered depth to determine an object's 3D location, and then adaptively filtering that 3D location based on velocity. In some implementations, an adaptive low pass filter may adjust a cutoff frequency based on velocity (e.g., how quickly the object, such as a person, is moving, and/or how quickly the person/device is moving relative to the object). In some implementations, a sequence of filters may be used to filter the depth data, including a distance filter (e.g., reduce noise in the depth signal), a size filter (e.g., filter 2D box size), and an adaptive position filter (e.g., filter 3D location of the object based on velocity).

In general, one innovative aspect of the subject matter described in this specification can be embodied in methods that include the actions of, at a device having a processor and one or more sensors, obtaining sensor data for a sequence of frames by the one or more sensors in a physical environment, where the physical environment includes an object, and the sensor data includes image data, depth data, device pose data, or a combination thereof, for each frame of the sequence of frames. The method further includes the actions of determining a representation of the object. The method further includes the actions of determining three-dimensional (3D) positions and size estimates of the representation of the object for each frame of the sequence of frames, wherein for each frame of the sequence of frames that includes image data and depth data, (i) the 3D position of the representation of the object is determined based on the device pose data and the depth data for each corresponding frame, and (ii) the size estimate of the representation of the object is determined based on the image data and the depth data, and for each frame of the sequence of frames that includes image data and excludes depth data, (i) the size estimate of the representation of the object is determined based on a prior size estimate from a prior frame of the sequence of frames that included image data and depth data, and (ii) the 3D position of the representation of the object is determined based on the size estimate of the representation of the object and a portion of the image data.

These and other embodiments may each optionally include one or more of the following features.

In some aspects, for each frame of the sequence of frames that includes image data and excludes depth data, the 3D position of the representation of the object is further based on a relationship between object size and image size.

In some aspects, determining the 3D positions and the size estimates of the representation of the object for each frame of the sequence of frames that includes image data and excludes depth data is based on an estimation of mapping a coordinate of a point in a 3D space associated with the object and the projection of the point to an image plane of a two-dimensional (2D) image.

In some aspects, the sensor data includes image data and depth data, wherein the image data is captured at a first rate and the depth data is captured at a second rate different than the first rate.

In some aspects, the object is in motion for at least a portion of frames of the sequence of frames. In some aspects, determining the 3D position and the size estimate of the representation of the object is based on a pose of the device.

In some aspects, the method further includes the actions of determining a change in a position of a viewpoint of the device during the sequence of frames, and adjusting the 3D position and the size estimate of the representation of the object based on the determined change in the position of the viewpoint.

In some aspects, the representation of the object includes a two-dimensional (2D) rectangle in a 3D coordinate space. In some aspects, the method further includes the actions of presenting a view of an extended reality (XR) environment on a display, wherein the view of the XR environment includes virtual content and at least a portion of the physical environment, wherein the portion of the physical environment includes the object.

In some aspects, the virtual content is adjusted based on the determined 3D position and the size estimate of the representation of the object. In some aspects, the image data is determined from an image sensor signal based on a machine learning model configured to identify image portions corresponding to the object.

In some aspects, the device includes a head-mounted device (HMD).

In general, another innovative aspect of the subject matter described in this specification can be embodied in methods that include the actions of, at a device having a processor and one or more sensors, obtaining a depth data signal for a sequence of frames associated with an object in a physical environment, determining filtered depth data by applying a distance filter to the depth data signal for the sequence of frames, determining a three-dimensional (3D) location of the object in the physical environment for each frame of the sequence of frames based on the first set of filtered depth data, determining a velocity of the object for each frame of the sequence of frames, and determining a filtered 3D location of the object in the physical environment for each frame of the sequence of frames, the filtered 3D location determined by applying an adaptive position filter to the 3D location determined for each frame of the sequence of frames, wherein a parameter of the adaptive position filter is based on the determined velocity of the object for each frame of the sequence of frames.

These and other embodiments may each optionally include one or more of the following features.

In some aspects, the method further includes the actions of determining a size estimate of a representation of the object for each frame of the sequence of frames based on the depth data signal or an image data signal, and determining a filtered size estimate by applying a size filter to the size estimate for each frame of the sequence of frames.

In some aspects, determining the 3D location of the object in the physical environment for each frame of the sequence of frames is based on a direction from the device to the object.

In some aspects, the direction is determined from depth points from the depth data signal that fall within a 2D box determined from object recognition data or based on motion sensor data tracking a pose of the device.

In some aspects, the method further includes the actions of presenting a view of an extended reality (XR) environment on a display, wherein the view of the XR environment includes virtual content and at least a portion of the physical environment, wherein the portion of the physical environment includes the object. In some aspects, the virtual content is adjusted based on the determined filtered 3D location.

In some aspects, the depth sensor signal includes distance information between a 3D location of the device and a 3D location of a surface of the object.

In some aspects, the parameter of the adaptive position filter includes a cutoff frequency, and wherein the cutoff frequency is adjusted based on the determined velocity of the object.

In some aspects, the device includes a head-mounted device (HMD).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figures 1A, 1B:
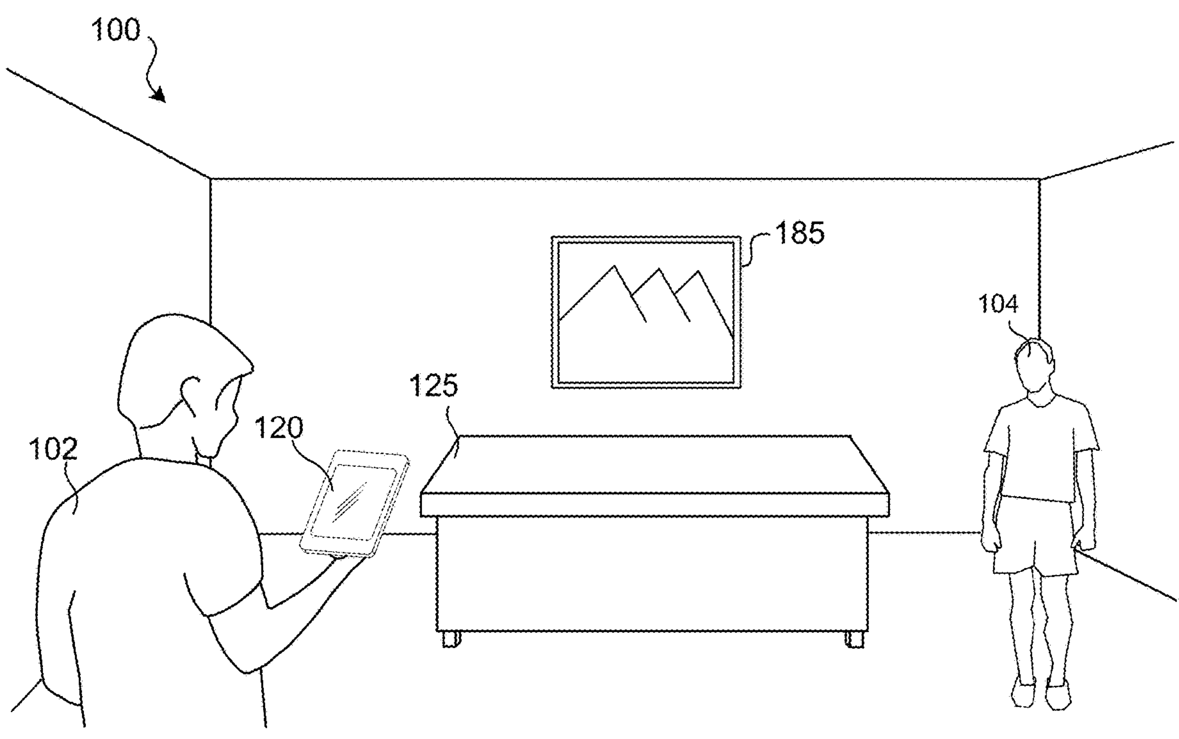
FIGS. 1A-1B illustrate exemplary electronic devices operating in a physical environment, in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIGS. 1A-1B illustrate exemplary electronic devices 110 and 120 operating in a physical environment 100. In the example of FIGS. 1A-1B, the physical environment 100 is a room that includes a desk 125 and a wall hanging object 185 (e.g., a painting, a poster, etc.). Additionally, the physical environment 100 includes another person, bystander 104. The electronic devices 110 and 120 may include one or more cameras, microphones, depth sensors, or other sensors that can be used to capture information about and evaluate the physical environment 100 and the objects within it, as well as information about the user 102 of electronic devices 110 and 120. The information about the physical environment 100 and/or user 102 may be used to provide visual and audio content and/or to identify the current location of the physical environment 100 and/or the location of the user within the physical environment 100.

In some implementations, views of an extended reality (XR) environment may be provided to one or more participants (e.g., user 102 and/or other participants not shown) via electronic devices 110 (e.g., a wearable device such as an HMD) and/or 120 (e.g., a handheld device such as a mobile device, a tablet computing device, a laptop computer, etc.). Such an XR environment may include views of a 3D environment that is generated based on camera images and/or depth camera images of the physical environment 100 as well as a representation of user 102 based on camera images and/or depth camera images of the user 102. Such an XR environment may include virtual content that is positioned at 3D locations relative to a 3D coordinate system (e.g., a 3D space) associated with the XR environment, which may correspond to a 3D coordinate system of the physical environment 100.

In some implementations, video (e.g., pass-through video depicting a physical environment) is received from an image sensor of a device (e.g., device 110 or device 120) and used to present the XR environment. In other implementations, optical see-through may be used to present the XR environment by overlaying virtual content on a view of the physical environment seen through a translucent or transparent display. In some implementations, a 3D representation of a virtual environment is aligned with a 3D coordinate system of the physical environment. A sizing of the 3D representation of the virtual environment may be generated based on, inter alia, a scale of the physical environment or a positioning of an open space, floor, wall, etc. such that the 3D representation is configured to align with corresponding features of the physical environment. In some implementations, a viewpoint within the 3D coordinate system may be determined based on a position of the electronic device within the physical environment. The viewpoint may be determined based on, inter alia, image data, depth sensor data, motion sensor data, etc., which may be retrieved via a virtual inertial odometry system (VIO), a simultaneous localization and mapping (SLAM) system, etc.

Each device 110 or 120 may include one or more sensors that capture light-intensity images, depth sensor images, audio data or other information about the user 102 and the physical environment 100. For example, the one or more sensors may capture images of the user's forehead, eyebrows, eyes, eye lids, cheeks, nose, lips, chin, face, head, hands, wrists, arms, shoulders, torso, legs, or other body portions. Sensor data about a user's eye, as one example, may be indicative of various user characteristics, e.g., the user's gaze direction over time, user saccadic behavior over time, user eye dilation behavior over time, etc. The one or more sensors may capture audio information including the user's speech and other user-made sounds as well as sounds within the physical environment 100.

One or more sensors on device 110 or 120, may identify user information based on proximity or contact with a portion of the user 102. As example, the one or more sensors may capture sensor data that may provide biological information relating to a user's cardiovascular state (e.g., pulse), body temperature, breathing rate, etc. The one or more sensors may capture data from which a user orientation within the physical environment can be determined. In this example, the user orientation corresponds to a direction that a torso of the user 102 is facing.

Content may be visible, e.g., displayed on a display of device 110 or 120, or audible, e.g., produced as audio by a speaker. In the case of audio content, the audio may be produced in a manner such that only user 102 is likely to hear the audio, e.g., via a speaker proximate the ear of the user or at a volume below a threshold such that nearby persons are unlikely to hear. In some implementations, the audio mode (e.g., volume), is determined based on determining whether other people are within a threshold distance or based on how close other people are with respect to the user 102.

In some implementations, the content provided by the device 110 or 120 and sensor features of device 110 may be provided using components, sensors, or software modules that are sufficiently small in size and efficient with respect to power consumption and usage to fit and otherwise be used in lightweight, battery-powered, wearable products such as wireless ear buds or other ear-mounted devices or head mounted devices (HMDs) such as smart/augmented reality (AR) glasses. Features can be facilitated using a combination of multiple devices. For example, a smart phone (connected wirelessly and interoperating with wearable device (s)) may provide computational resources, connections to cloud or internet services, location services, etc.

In some implementations, the device 110 or 120 obtains physiological data (e.g., EEG amplitude/frequency, pupil modulation, eye gaze saccades, etc.) from the user via one or more sensors that are proximate or in contact with the user 102. For example, the device 110 or 120 may obtain pupillary data (e.g., eye gaze characteristic data) from an inward facing eye tracking sensor. In some implementations, the device 110 or 120 may include additional sensors for obtaining image or other sensor data of the physical environment 100.

In some implementations, data is shared amongst a group of devices to improve user state or environment understanding. For example, device 110 or 120 may share information (e.g., images, audio, or other sensor data) corresponding to user 102 or the physical environment 100 (including information about other users) to better understand user 102 and physical environment 100. In some implementations, as illustrated in FIG. 1A, the device 120 is a handheld electronic device (e.g., a smartphone or a tablet). In some implementations the device 120 is a laptop computer or a desktop computer. In some implementations, the device 120 has a touchpad and, in some implementations, the device 120 has a touch-sensitive display (also known as a "touch screen" or "touch screen display"). In some implementations, the device 120 is a wearable device such as an HMD, such as device 110.

FIG. 1B illustrates an example in which the devices within the physical environment 100 includes an HMD device 110. Numerous other types of devices may be used including mobile devices (e.g., device 120), tablet devices, wearable devices, hand-held devices, personal assistant devices, AI-assistant-based devices, smart speakers, desktop computing devices, menu devices, cash register devices, vending machine devices, juke box devices, or numerous other devices capable of presenting content, capturing sensor data, or communicating with other devices within a system, e.g., via wireless communication. For example, assistance may be provided to a vision impaired person to help the person understand a menu by providing data from the menu to a device being worn by the vision impaired person, e.g., enabling that device to enhance the user's understanding of the menu by providing visual annotations, audible cues, etc.

In some implementations, the device 110 or 120 (or other devices) may include eye tracking systems for detecting eye position and eye movements. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, an illumination source on a device may emit NIR light to illuminate the eyes of the user and the NIR camera may capture images of the eyes of the user. In some implementations, images captured by the eye tracking system may be analyzed to detect positions and movements of the eyes of the user, or to detect other information about the eyes such as pupil dilation or pupil diameter. Moreover, the point of gaze estimated from the eye tracking images may enable gaze-based interaction with content shown on the device. Additional cameras may be included to capture other areas of the user (e.g., an HMD with a jaw cam to view the user's mouth, a down cam to view the body, an eye cam for tissue around the eye, and the like). These cameras and other sensors can detect motion of the body, or signals of the face modulated by the breathing of the user (e.g., remote PPG).

In some implementations, the device 110 or 120 (or other devices) employ various physiological or behavioral sensor, detection, or measurement systems. Detected physiological data may include, but is not limited to, EEG, electrocardiogra electromyography (EMG), functional near infrared spectroscopy signal (fNIRS), blood pressure, skin conductance, or pupillary response. Detected behavioral data may include, but is not limited to, facial gestures, facial expressions, body gestures, or body language based on image data, voice recognition based on acquired audio signals, etc.

The user data (e.g., upper facial feature characteristic data, lower facial feature characteristic data, and eye gaze characteristic data, etc.), including information about the position, location, motion, pose, etc., of the head or body of the user, may vary in time and a device 110 or 120 (or other devices) may use the user data to track skeletal movements (e.g., body, hands, head, etc.). In some implementations, the user data includes texture data of the facial features such as eyebrow movement, chin movement, nose movement, cheek movement, etc. For example, when a person (e.g., user 102) performs a facial expression or micro expression associated with lack of familiarity or confusion, the upper and lower facial features can include a plethora of muscle movements that are used to assess the state of the user based on the captured data from sensors.

Figure 2A:
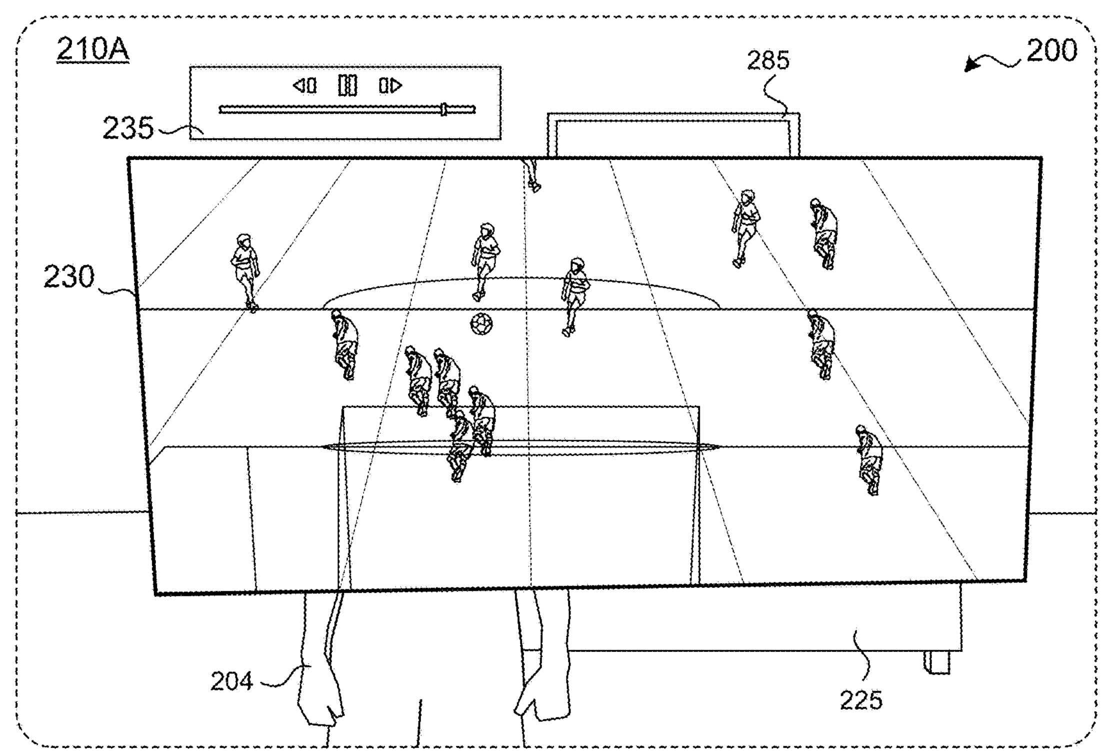
FIGS. 2A and 2B illustrate views of an extended reality (XR) environment provided by a device, such as the electronic devices of FIGS. 1A-1B, in accordance with some implementations.
Figure 2B:
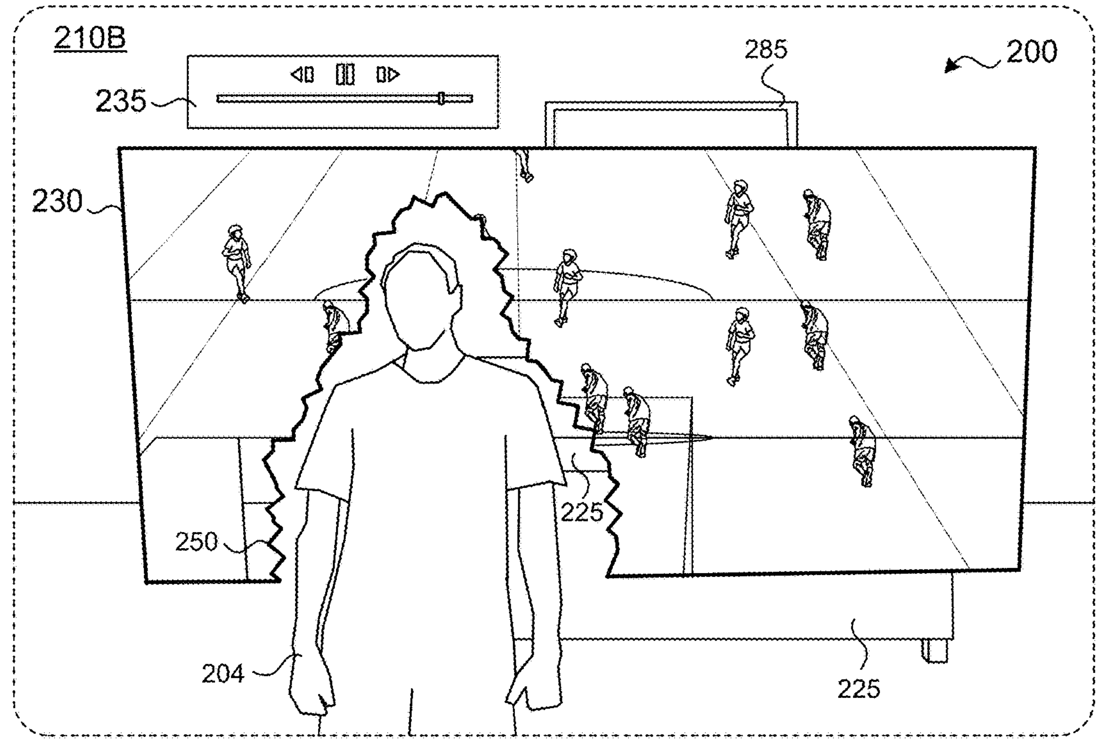

FIGS. 2A and 2B illustrate views of an XR environment 210A and 210B, respectively, provided by the device 110 or 120 of FIGS. 1A-1B in accordance with some implementations. Each FIGS. 2A and 2B includes an exemplary user interface 235 of an application 230 and a depiction 225 of desk 125 and a depiction 285 of wall hanging 185 (e.g., representations of physical objects that may be viewed as pass-through video or may be a direct view of the physical object through a transparent or translucent display). Additionally, each FIGS. 2A and 2B includes a representation 204 of bystander 104. Providing such a view may involve determining 3D attributes of the physical environment 100 and positioning virtual content, e.g., user interface 235 and application 230, in a 3D coordinate system corresponding to that physical environment 100.

In the examples of FIGS. 2A and 2B, the optional user interface 235 may include various content items, including an application portion 230, control elements, and a scroll bar. The application portion 240 is displayed with 3D effects in the view provided by device 110 or 120. The user interface 235 and application 230 (e.g., a virtual television) is simplified for purposes of illustration and user interfaces in practice may include any degree of complexity, any number of content items, and/or combinations of two-dimensional (2D) and/or 3D content. The user interface 235 and application portion 230 may be provided by operating systems and/or applications of various types including, but not limited to, messaging applications, web browser applications, content viewing applications, content creation and editing applications, or any other applications that can display, present, or otherwise use visual and/or audio content.

FIGS. 2A and 2B illustrate different perspectives of visualizing representations of real-world items in combination with view of virtual content. As illustrated, the virtual content for the application portion 230 is shown as a large virtual television screen. (e.g., a lower-level immersion level). Alternatively, the application portion 230 may encompass the entire view of the user and surround the user as if he or she could only see the virtual content around them (e.g., a fully immerses view or a higher level of immersion). In either case, each FIGS. 2A and 2B illustrate a representation 204 of bystander 104, as the bystander may be approaching the user (e.g., walking towards the user 102), as the user 102 is watching content on the application portion 230 (e.g., watching a soccer match). FIG. 2A illustrates where the application portion 230 prevents or hides the representation 204 of bystander 104 from overlapping the presented content. FIG. 2B illustrates where the application portion 230 allows the representation 204 of bystander 104 to break through the presented content, as represented by the breakthrough element 250. In other words, the video pass through feed of the physical environment, which includes the bystander 104 standing in front of the desk 125, may be allowed to be shown through (e.g., with some augmentations) the 3D virtual content. The breakthrough element 250 is simplified for purposes of illustration and user interfaces in practice may include any degree of complexity, any number of content items, and/or combinations of two-dimensional (2D) and/or 3D content, to illustrate fading in views of a portion of the physical environment or of a specific object (e.g., representation 204 of bystander 104).

Figure 3:
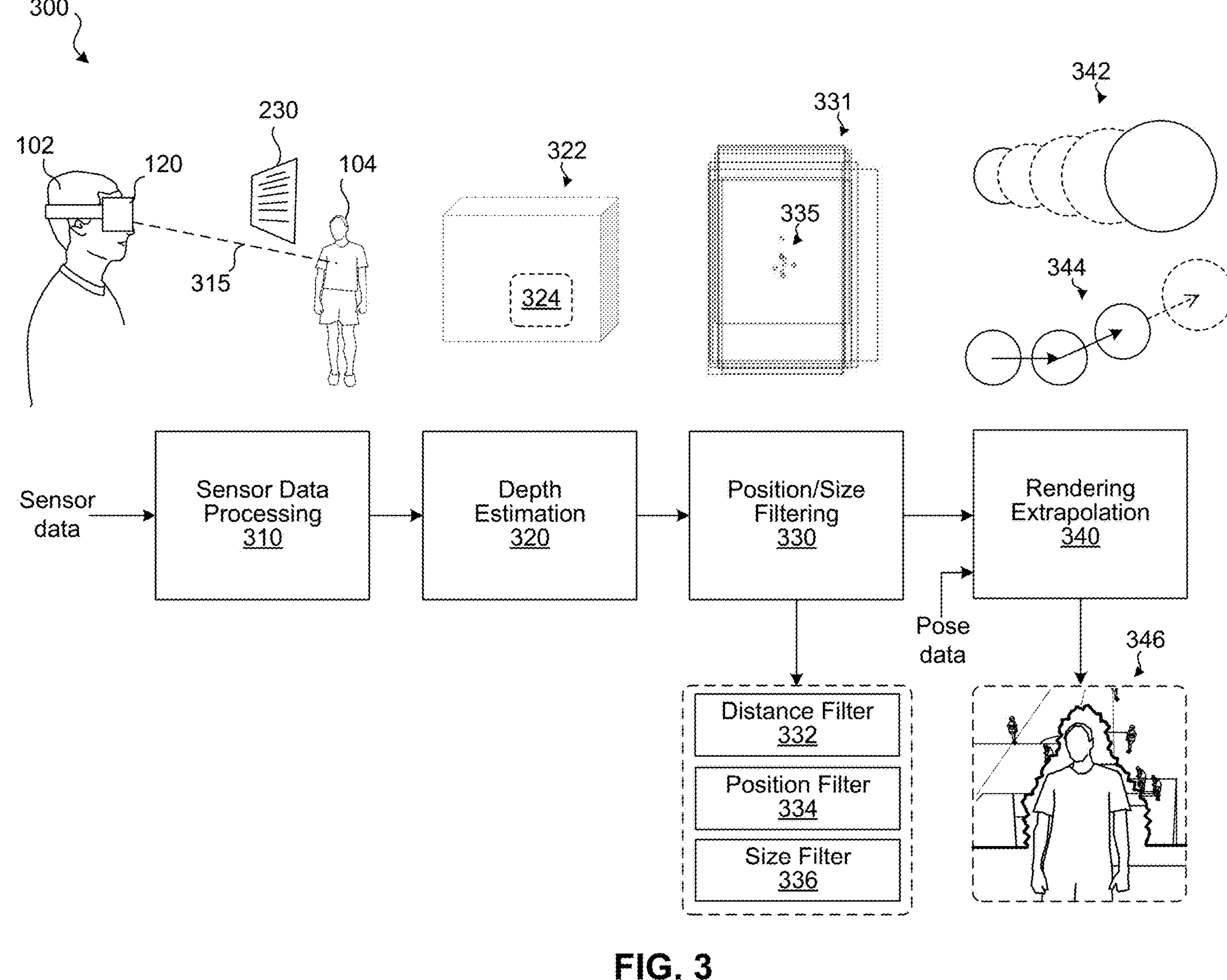
FIG. 3 illustrates size and position estimation determination of an object, in accordance with some implementations.

FIG. 3 illustrates a system flow diagram of an example environment 300 in which a system can determine size and position estimation determination of an object, in accordance with some implementations. In some implementations, the system flow of the example environment 300 is performed on a mobile device (e.g., device 120), desktop, laptop, HMD (e.g., device 110), or server device. The images of the example environment 300 can be displayed on a device (e.g., device 120 of FIG. 1) that has a screen for displaying images and/or a screen for viewing stereoscopic images such as a head-mounted device (HMD) (e.g., device 110 of FIG. 1). In some implementations, the system flow of the example environment 300 is performed on processing logic, including hardware, firmware, software, or a combination thereof. In some implementations, the system flow of the example environment 300 is performed on a processor executing code stored in a non-transitory computer-readable medium (e.g., a memory).

The system flow of the example environment 300 acquires from sensors light intensity image data (e.g., live camera feed such as RGB from a light intensity camera), depth image data (e.g., depth image data such as RGB-D from a depth camera), and other sources of physical environment information (e.g., camera positioning information such as position and orientation data from position sensors, i.e., pose data) of a physical environment (e.g., the physical environment 100 of FIG. 1), assesses the image and depth data, determines depth estimation data with respect to an object(s) data during acquisition of the images, filters the data to reduce noise, and generates a rendering extrapolation from the filtered depth data.

In an example implementation, the environment 300 includes a sensor data processing instruction set 310 for assessing an image/depth composition pipeline that acquires or obtains data (e.g., image and depth data from image source(s) such as sensors) for the physical environment. Example environment 300 is an example of acquiring sensor data (e.g., light intensity data, depth data, and position information) for a plurality of image frames. The image source(s) may include a depth camera that acquires depth data of the physical environment, a light intensity camera (e.g., RGB camera) that acquires light intensity image data (e.g., a sequence of RGB image frames), and position sensors to acquire positioning information. For the positioning information, some implementations include a visual inertial odometry (VIO) system to determine equivalent odometry information using sequential camera images (e.g., light intensity data 503) to estimate the distance traveled. Alternatively, some implementations of the present disclosure may include a SLAM system. The SLAM system may include a multidimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

The sensor data processing instruction set 310 may include a machine learning model that identifies image portions corresponding to one or more object(s), e.g., an object classifier/identifier. The sensor data processing instruction set 310 may analyze the sensor data, and determine 2D camera rectangles and depth samples associated with a distance 315 from the device 120 to a surface of an object (e.g., bystander 104). The 2D camera rectangles may include 2D object recognition label 324 (e.g., a 2D box) that identifies an object, such as a person (e.g., bystander 104) within the object recognition data 3D space 322.

In an example implementation, the environment 300 includes a depth estimation instruction set 320. The depth estimation instruction set 320 may receive the 2D camera rectangles and depth samples associated with a distance 315 from the device 120 to the object from the sensor data processing instruction set 310. For example, for a single frame of video, machine learning object recognition data may be provided as a collection of 2D boxes with labels (2D object recognition label 324). The depth estimation instruction set 320 may be configured to use the 2D box, a headset transform, and a depth estimate (e.g., distance 315) to determine an estimate of the object location in 3D space. For example, each corner of the 2D box may lie along a ray in 3D space, and the depth data signal may provide how far along the ray to place the object. For example, a LiDAR sensor may provide depth information at various points in a scene at 1 HZ, and these points may be projected onto a 2D camera feed. For an object identified in the camera feed (e.g., bystander 104), all the depth points may be collected that fall within a respective 2D box, and those depth points may be aggregated to determine an estimate of the overall depth for the object.

The depth estimation instruction set 320 may determine the 3D positions and the size estimates of an object for each frame of a sequence of frames. The depth estimation instruction set 320 may determine the 3D positions and the size estimates when there is image data and depth data available, and for each frame when there is image data, but depth data is excluded (e.g., 1 Hz depth data vs 10 Hz image data). For example, the depth estimation instruction set 320, for each frame that includes image data and depth data, the 3D position of the object may be determined based on the device pose data (e.g., a current pose and sensor/camera calibration) and the depth data for each corresponding frame, and the size estimate of the representation of the object may be determined based on the image data and the depth data. For example, on frames when a depth estimate is received, the size of the rectangle may be solved, e.g., for frames for which both depth and image data is available, the object's 3D position is determined from the device's current pose and the distance-to-object/depth sensor values, and the object's size is determined based on identifying an image portion corresponding to the object and the distance-to-object/depth sensor values.

Additionally, the depth estimation instruction set 320, for each frame that includes image data and excludes depth data, the size estimate of a representation of an object may be determined based on a prior size estimate from a prior frame of the sequence of frames that included image data and depth data, and the 3D position of the object may be determined based on the size estimate of the representation of the object and a portion of the image data. For example, on frames when depth data is not available (e.g., 1 Hz depth data vs 10 Hz image data), the real-world object size estimate may be used to solve for depth for frames for which depth data is not available but image data is available. In other words, where the image data and/or machine learning object recognition data is obtained at 10 hz and depth estimates are acquired at 1 hz, depth estimates are not available for 9 of 10 image frames, the object's size is determined based on one or more prior size estimates (e.g., previously determined when a depth estimate was available), and the object's 3D position is determined based on object size and based on identifying the image portion corresponding to the object. Thus, apparent size is used as a proxy for depth during intermediate periods/frames for which depth sensor data is not available. The depth estimation instruction set 320 may determine object size, for frames when depth data is not available, based on an estimation of mapping a coordinate of a point in a 3D space associated with the object and the projection of the point to an image plane of a two-dimensional (2D) image. For example, the relationship between object size and image size determined by a pinhole camera model:

$$\frac{i}{f} = \frac{o}{d}$$

where i is the image size, f is the distance from the center of the camera sensor (e.g., optical center) to the principal point on the image plane, o is the object size, and dis the determined distance from the center of the camera sensor to the object.

In an example implementation, the environment 300 further includes a position/size filtering instruction set 330. In an example implementation, the position/size filtering instruction set 330 may be used for filtering depth data signal from the depth estimation instruction set 320. For example, the depth estimation from the depth estimation instruction set 320 may provide a 3D ray, size, and distance for the object for a sequence of frame, however, these signals must be filtered to remove noise. Noise would otherwise create visual artifacts where the rendered virtual content jumps or shake around, despite the real-world object remaining stationary. For example, the noise diagram 331 illustrates an example of the noise that may be present with a series of depth signal estimates that depict noise, and/or an example of the noise that may be present in the position and the size of the region in the 2D image. The noise diagram 331 includes 2D boxes 335 (e.g., bounding boxes) captured for the same stationary object over one second in time. Despite the noise in the depth estimation data and/or the noise in the position and the size of the region in the 2D image, this object should be depicted as stationary. For example, the machine learning model (e.g., the position/size filtering instruction set 330) may be examining very rough patches of pixels in the image, thus there may be noise introduced in the data.

In an example implementation, the position/size filtering instruction set 330 uses the filtered depth to determine an object's 3D location, and adaptively filtering that 3D location based on a velocity of the object. The position/size filtering instruction set 330 may include a sequence of filters to filter the depth data, position data, and/or size data. The sequence of filters may include a distance filter 332 (e.g., reduce noise in the depth signal), an adaptive position filter 336 (e.g., filter 3D location of the object based on velocity), and/or a size filter 334 (e.g., filter 2D box size).

Due to the lower frequency and possible sampling error, the depth signal may be more inaccurate and contains more noise than the 2D position of the object in the camera feed (e.g., represented as ray direction). The distance filter 332 may include a low pass filter to reduce some of the noise in the depth signal with the goal to provide the depth signal with a similar level of noise as the ray direction.

In some implementations, an output of the distance filter 332 may be combined with the ray of the depth signal to create a 3D point, and this 3D point may then be passed to the position filter 336. The position filter 334 may be an adaptive low pass filter, similar yet unique when compared to a one euro filter ("1€ filter"). The position/size filtering instruction set 330 may determine a velocity of a 3D location/position of an object (e.g., how quickly the object is moving and/or the person/device is moving relative to the object). The adaptive low pass filter 334 may then adjust a cutoff frequency based on the velocity. For example, as the object moves faster, the filter weakens, allowing the output to rapidly respond to changes in the input signal. Moreover, as the object slows, the filter strengthens, reducing the filters response to changes in the input, especially noise. For example, noise may be less apparent when the object is moving and more apparent when stationary. In some implementations, the adaptive filter 336 may improve existing filters in a few ways. The most important is that the depth component of velocity is removed which is used to adjust the filter 334. This is done by using the component of velocity which is tangent to a circle around the device of the viewer. Thus, only the lateral motion, which is most visible to the viewer is used, which avoids unnecessary filter adjustment due to changes in depth. Another improvement is a change to how the cutoff frequency is computed from velocity. For example, some filter techniques may use only a magnitude of the velocity component, but the adaptive position filter 334 applies a function to remove a fixed amplitude of background noise from the signal.

In some implementations, the 2D box size may be filtered before the size of the 2D box is translated into 3D. In some implementations, based on an assumption that the object size does not change rapidly, the size filter 336 may include a simple low pass filter to remove noise such that another adaptive filter may not be necessary (e.g., using the apparent size to estimate depth). In some implementations, the size filter may remove sudden changes in size. In some implementations that utilize a size filter, the position/size filtering instruction set 330 may determine a size estimate of the object for each frame of the sequence of frames based on the depth data signal or an image data signal, and determine a filtered size estimate by applying a size filter to the size estimate for each frame of the sequence of frames.

In an example implementation, the environment 300 further includes a rendering extrapolation instruction set 340. In an example implementation, the rendering extrapolation instruction set 340 may extrapolate a rendering for a view 346 of an XR environment based on obtaining the filtered depth data from the position/size filtering instruction set 330 and head pose data from the rendering device (e.g., device 110, device 120, etc.). In some implementations, a filtered estimate of the position of the object in 3D is provided to the rendering extrapolation instruction set 340, which may also include the filtered size of the box corresponding with the 3D position. However, this signal may be produced at 10 Hz, and rendering must occur at a much higher frame rate (e.g., 90 Hz). This is especially important in a XR application when viewing on an HMD to avoid motion sickness.

In some implementations, the rendering extrapolation instruction set 340 uses the filtered depth signal in world space coordinates to take advantage of SLAM provided by device 110 or device 120. For example, the headset transform may be updated more rapidly than the object position signals and the apparent location of objects take advantage of these high frequency data updates. However, this is also why preparing a good depth estimate at prior stages is so important. If the depth estimate is incorrect then the position of the object estimated by SLAM will not be correct, even for stationary objects. This will result in a discontinuous "snap" into the correct position when a new 10 Hz position signal update is received. The more accurate the position estimation the less discontinuity there will be. The rendering extrapolation instruction set 340 may account for the "parallax" effect, e.g., as a camera moves horizontally, objects visible on the camera plane move across the image, however, objects closer to the camera move more than objects further way, as their relative angle to the viewer changes more. Thus, objects with incorrect depth estimates will have incorrect parallax movement between 10 hz data updates.

In an exemplary implementation, at 90 Hz, the rendering extrapolation instruction set 340 may use the headset position (e.g., pose of the device 110, 120), 3D ray, and filtered image size to construct a 3D size of the object. For example, in the real world, apparent size and depth are interrelated, but in an XR system, the apparent size of the object may be invariant under depth estimation, and any noise in depth, inaccurate depth readings, or artifacts of correcting for depth may not affect an apparent size of the region. Thus, as illustrated in the diagram 342, interpolation may be used by the rendering extrapolation instruction set 340 to smoothly sample a low frequency signal at a higher frequency which can provide good visual results, but can introduce significant latency. To interpolate, an XR system must have at least two states a "from" and a "to" state, so in a real-time estimation system it is at least one frame of information behind the latest. For example, interpolation may smoothly extend the 10 Hz signal to 90 Hz, but may introduce a delay (e.g., 100 ms) which may cause the virtual content to noticeably lag behind, even if the filtered signal closely tracks the object. To compensate for the lag introduced by interpolation, the rendering extrapolation instruction set 340 may extrapolate a new position from past data, and interpolate to that point. As illustrated in diagram 344, the extrapolated position may be found with a linear prediction filter to compute a weighted sum of the most recent and prior velocities, and adds that to the last known state. The extrapolation may be a prediction, and sometimes can be incorrect. Thus, when a moving object abruptly stops, there may be a slight "spring" affect as the extrapolated position overshoots the signal for a few frames, and then is corrected.

Figure 4:
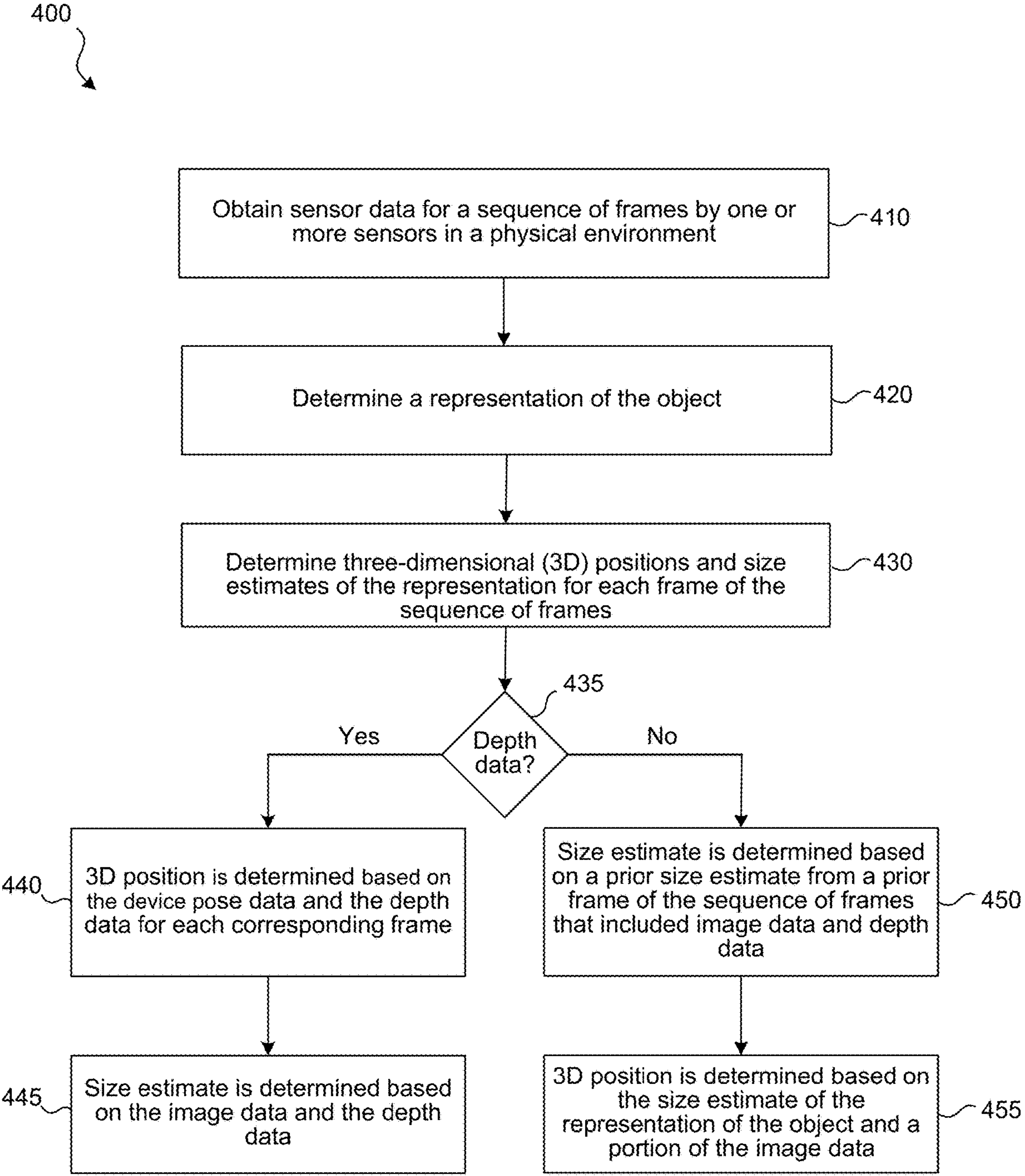
FIG. 4 is a flowchart illustrating a method for determining three-dimensional (3D) positions and size estimates of an object in accordance with some implementations.

FIG. 4 is a flowchart illustrating a method 400 for determining 3D positions and size estimates of an object in accordance with some implementations. In some implementations, a device such as electronic device 110 or device 120 performs method 400. In some implementations, method 400 is performed on a mobile device (e.g., device 120), desktop, laptop, HMD (e.g., device 110), or server device. The method 400 is performed by processing logic, including hardware, firmware, software, or a combination thereof. In some implementations, the method 400 is performed on a processor executing code stored in a non-transitory computer-readable medium (e.g., a memory). In some implementations, an electronic device performing the method 400 includes a processor and one or more sensors.

At block 410, at a device (e.g., device 110, 120, and the like) having a processor and one or more sensors, the method 400 obtains sensor data for a sequence of frames by one or more sensors in a physical environment. For example, sensor data is acquired at an initial time period for assessing distance and/or sizes of an object. In some implementations, the physical environment includes at least one object (e.g., bystander 104). In some implementations, the sensor data signal includes image data (e.g., RGB data), depth data (e.g., lidar-based depth data, and/or densified depth data), device pose data, or a combination thereof, for each frame of the sequence of frames. For example, sensors on a device (e.g., camera's, IMU, etc. on device 110 or 120) can capture information about the position, location, motion, pose, etc., of the device and/or of the one or more objects in the physical environment.

In some implementations, the image data is determined from an image sensor signal based on a machine learning model configured to identify image portions corresponding to the object. For example, an image sensor signal that provides images interpreted (e.g., by a machine learning model) to identify image portions corresponding to the object. For example, a machine learning model may identify that an object (e.g., bystander 104) is an object associated with motion, such as a person, pet, etc. In some implementations, the processes described for determining position and size estimations herein may also be used for any non-static objects, not just people and pets.

In some implementations, the sensor data includes multiple sensor data signals. For example, one of the multiple sensor data signals may be an image signal, one of the multiple sensor data signals may be a depth signal (e.g., a structured light, a time-of-flight, or the like), one of the multiple sensor data signals may be a device motion signal (e.g., an accelerometer, an inertial measurement unit (IMU) or other tracking systems), and the like. In some implementations, the sensor data includes at least one of light intensity image data, depth data, head/device pose data, and motion data, or a combination thereof.

At block 420, the method 400 determines a representation (e.g., a simple 3D model) of the object. For example, the depth sensor readings may be used to estimate the size of a simple 3D model of the object.

In some implementations, the object may be modeled as a 2D rectangle in a 3D coordinate space (e.g., floating in 3D space, facing the camera). In some implementations, machine learning object recognition data may be obtained or determined from image data, and the machine learning object recognition data may include a collection of 2D boxes with labels (e.g., semantic labels), where the labels may specify the kind of object detected (e.g., a person, pet, etc.). For example, as illustrated in the object recognition data 3D space 322, the object recognition label 324 (e.g., a 2D box) identifies an object, such as a person (e.g., bystander 104).

At block 430, the method 400 determines 3D positions and size estimates of the representation for each frame of the sequence of frames. Determining 3D positions and size estimates of the representation is based on determining, at block 435, whether each frame of the sequence of frames includes image data and depth data, or whether each frame of the sequence of frames includes image data and excludes depth data. For example, depth data may be acquired at a rate (e.g., 1 Hz) that is slower than the rate that the image data and/or machine learning object recognition data is acquired (e.g., 10 Hz).

At block 440, the method 400, for each frame of the sequence of frames that includes image data and depth data, the 3D position of the representation of the object is determined based on the device pose data (e.g., a current pose and sensor/camera calibration) and the depth data for each corresponding frame, and at block 445, the size estimate of the representation of the object is determined based on the image data and the depth data. For example, on frames when a depth estimate is received, the size of the rectangle may be solved, e.g., for frames for which both depth and image data is available, the object's 3D position is determined from the device's current pose and the distance-to-object/depth sensor values, and the object's size is determined based on identifying an image portion corresponding to the object and the distance-to-object/depth sensor values.

At block 450, the method 400, for each frame of the sequence of frames that includes image data and excludes depth data, the size estimate of the representation of the object is determined based on a prior size estimate from a prior frame of the sequence of frames that included image data and depth data, and at block 445, the 3D position of the representation of the object is determined based on the size estimate of the representation of the object and a portion of the image data. For example, on frames when depth data is not available (e.g., 1 Hz depth data vs 10 Hz image data), the real-world object size estimate may be used to solve for depth for frames for which depth data is not available but image data is available. In other words, where the image data and/or machine learning object recognition data is obtained at 10 hz and depth estimates are acquired at 1 hz, depth estimates are not available for 9 of 10 image frames, the object's size is determined based on one or more prior size estimates (e.g., previously determined when a depth estimate was available), and the object's 3D position is determined based on object size and based on identifying the image portion corresponding to the object. Thus, apparent size is used as a proxy for depth during intermediate periods/frames for which depth sensor data is not available.

In some implementations, for each frame of the sequence of frames that includes image data and excludes depth data, the 3D position of the representation of the object is further based on a relationship between object size and image size. Additionally, or alternatively, in some implementations, determining the 3D positions and the size estimates of the representation of the object for each frame of the sequence of frames that includes image data and excludes depth data is based on an estimation of mapping a coordinate of a point in a 3D space associated with the object and the projection of the point to an image plane of a two-dimensional (2D) image (e.g., a pinhole camera model).

In some implementations, the object is in motion for at least a portion of frames of the sequence of frames. For example, the bystander 104 is walking around the room (e.g., physical environment 100). Thus, as the bystander 104 is walking around the room, the processes described herein can determine the 3D positions and the size estimates of the representation of the object for each frame of the sequence of frames while the bystander 104 is in motion.

In some implementations, determining the 3D position and the size estimate of the representation of the object is based on a pose of the device. In some implementations, the method 400 may further include the actions of determining a change in a position of a viewpoint of the device during the sequence of frames, and adjusting the 3D position and the size estimate of the representation of the object based on the determined change in the position of the viewpoint. For example, based on a location and a viewpoint of the device, e.g., while the device 110, an HMD, is being worn by the user, or the viewpoint of device 120, a mobile device, the 3D position and the size estimate of the representation of the object (e.g., bystander 104) may be determined based on the pose of the device used to view the XR environment (e.g., render extrapolation).

In some implementations, the method 400 may further include the actions of presenting a view (e.g., one or more frames) of an extended reality (XR) environment on a display, wherein the view of the XR environment includes virtual content and at least a portion of the physical environment, where the portion of the physical environment includes the object. In some implementations, the virtual content is adjusted based on the determined 3D position and the size estimate of the representation of the object. For example, as illustrated in view 200B of FIG. 2B, the virtual content around the breakthrough aspect 250 of the person (e.g., bystander 104) of the XR environment.

Figure 5:
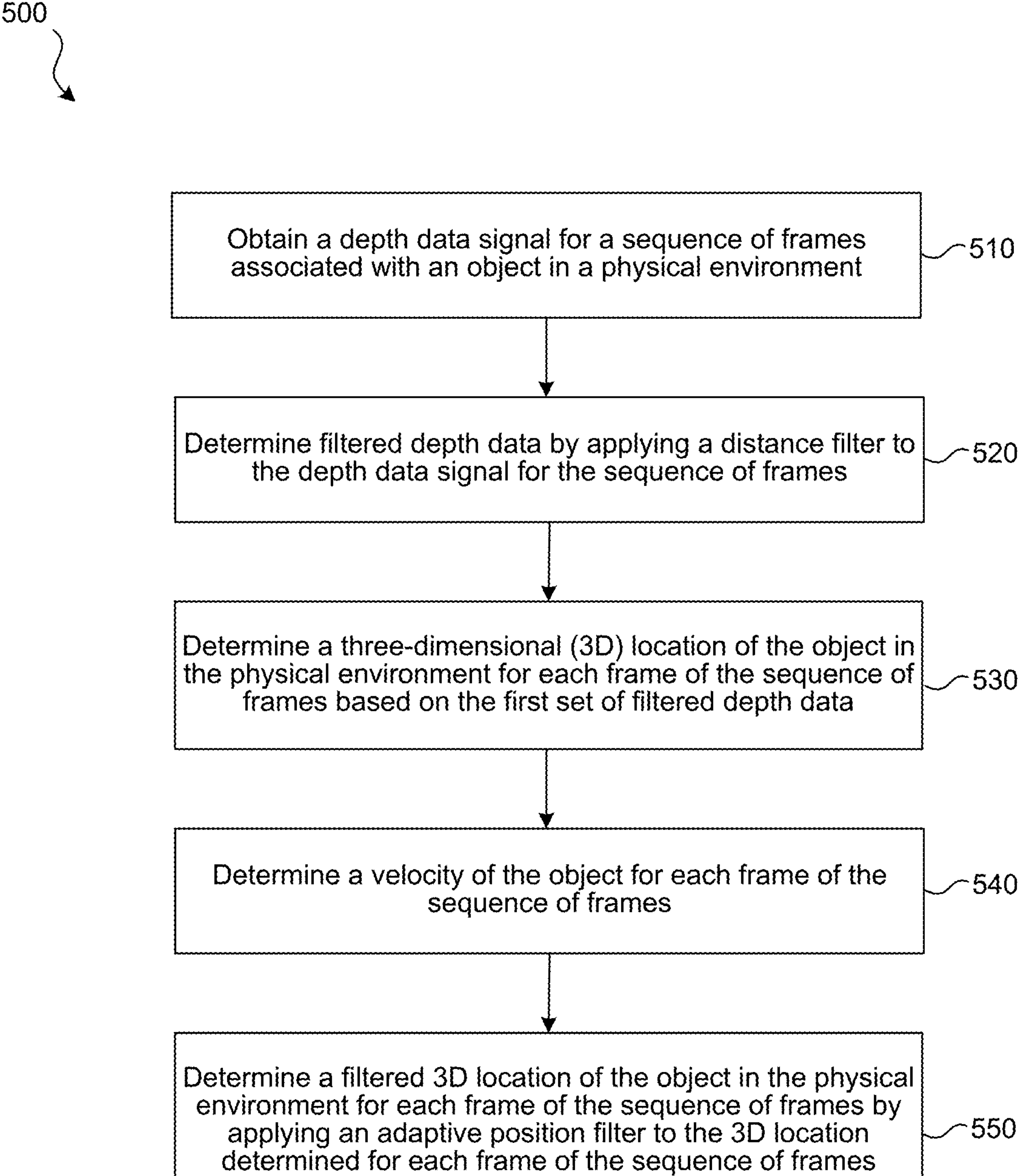
FIG. 5 is a flowchart illustrating a method for filtering depth data and using the filtered depth to determine an object's 3D location in accordance with some implementations.

FIG. 5 is a flowchart illustrating a method 500 for filtering depth data, and using the filtered depth to determine an object's 3D location, and adaptively filtering that 3D location based on a velocity of the object in accordance with some implementations. In some implementations, the method 500 may be utilized for filtering other data such as image data for a machine learning model, and using the filtered image data to determine an object's 3D location, and adaptively filtering that 3D location based on a velocity of the object in accordance with some implementations. In some implementations, a device such as electronic device 110 or device 120 performs method 500. In some implementations, method 500 is performed on a mobile device (e.g., device 120), desktop, laptop, HMD (e.g., device 110), or server device. The method 500 is performed by processing logic, including hardware, firmware, software, or a combination thereof. In some implementations, the method 500 is performed on a processor executing code stored in a non-transitory computer-readable medium (e.g., a memory). In some implementations, an electronic device performing the method 500 includes a processor and one or more sensors.

At block 510, at a device (e.g., device 110, 120, and the like) having a processor and one or more sensors, the method 500 obtains a depth data signal for a sequence of frames associated with an object in a physical environment. For example, the depth sensor signal provides distance-to-object info such as lidar-based depth (e.g., depth information at various points in the scene at 1 HZ) and/or densified depth. In some implementations, the depth sensor signal includes distance information between a 3D location of the device and a 3D location of a surface of the object (e.g., bystander 104). In some implementations, image data for a machine learning model may be obtained for the filtering process of method 500.

For example, sensor data is acquired at an initial time period for assessing distance and/or sizes of an object. In some implementations, the physical environment includes at least one object (e.g., bystander 104). In some implementations, a sensor data signal includes image data (e.g., RGB data), depth data (e.g., lidar-based depth data, and/or densified depth data), device pose data, or a combination thereof, for each frame of the sequence of frames. For example, sensors on a device (e.g., camera's, IMU, etc. on device 110 or 120) can capture information about the position, location, motion, pose, etc., of the device and/or of the one or more objects in the physical environment.

At block 520, the method 500 determines filtered depth data by applying a distance filter to the depth data signal for the sequence of frames. For example, apply the distance filter to reduce noise in the depth signal.

At block 530, the method 500 determines a 3D location of the object in the physical environment for each frame of the sequence of frames based on the first set of filtered depth data. For example, use filtered distance to determine 3D location of object (e.g., using a ray direction to the object determined from depth points that fall within a 2D box such that the 2D box).

In some implementations, headset transform and depth estimate may be combined to get an estimate of the object location in 3D space, where each corner of a 2D box lies along a ray in 3D, e.g., the depth allows a determination of how far along the ray to place the object.

In some implementations, determining the 3D location of the object in the physical environment for each frame of the sequence of frames is based on a direction from the device to the object. In some implementations, the direction is determined from depth points from the depth data signal that fall within a 2D box determined from object recognition data or based on motion sensor data tracking a pose of the device (e.g., machine learning data).

At block 540, the method 500 determines a velocity of the object for each frame of the sequence of frames. For example, a velocity of the determined 3D position of the object may be determined (e.g., how quickly the bystander 104 is moving frame-to-frame).

At block 550, the method 500 determines a filtered 3D location of the object in the physical environment for each frame of the sequence of frames by applying an adaptive position filter to the 3D location determined for each frame of the sequence of frames. In some implementations, a parameter of the adaptive position filter may be based on the determined velocity of the object for each frame of the sequence of frames. In some implementations, the parameter of the adaptive position filter includes a cutoff frequency, and the cutoff frequency may be adjusted based on the determined velocity of the object. For example, apply an adaptive position filter to reduce noise in the depth signal. In some implementations, velocity may be used with the depth to determine the cutoff frequency for the filter. As the object moves faster, the filter weakens, allowing the output to rapidly respond to changes in the input signal.

In an exemplary implementation, a size filter may be used. For example, the 2D box size may be filtered before the size of the 2D box is translated into 3D. In some implementations, based on an assumption that the object size does not change rapidly, a simple low pass filter may be used as the size filter to remove noise. In some implementations, the size filter may remove sudden changes in size. In some implementations that utilize a size filter, the method 500 may further include the actions of determining a size estimate of a representation of the object for each frame of the sequence of frames based on the depth data signal or an image data signal, and determining a filtered size estimate by applying a size filter to the size estimate for each frame of the sequence of frames.

In some implementations, the method 500 may further include the actions of presenting a view (e.g., one or more frames) of an extended reality (XR) environment on a display, wherein the view of the XR environment includes virtual content and at least a portion of the physical environment, where the portion of the physical environment includes the object. In some implementations, the virtual content is adjusted based on the determined 3D position and the size estimate of the representation of the object. For example, as illustrated in view 200B of FIG. 2B, the virtual content around the breakthrough aspect 250 of the person (e.g., bystander 104) of the XR environment.

Figure 6:
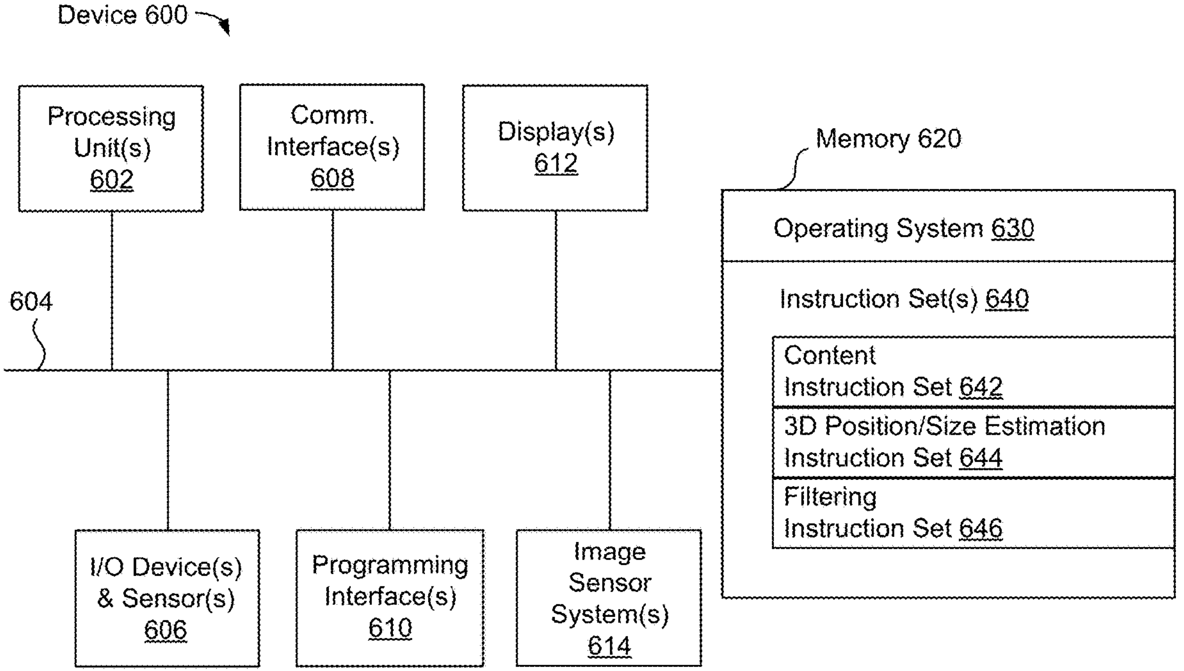
FIG. 6 is a block diagram of an electronic device in accordance with some implementations.

FIG. 6 is a block diagram of electronic device 600. Device 600 illustrates an exemplary device configuration for electronic device 110 or device 120. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 600 includes one or more processing units 602 (e.g., microprocessors, ASICs, FPGAs, GPUs, CPUs, processing cores, and/or the like), one or more input/output (I/O) devices and sensors 606, one or more communication interfaces 608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 610, one or more output device(s) 612, one or more interior and/or exterior facing image sensor systems 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 612 include one or more displays configured to present a view of a 3D environment to the user. In some implementations, the one or more device(s) 612 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 600 includes a single display. In another example, the device 600 includes a display for each eye of the user.

In some implementations, the one or more output device(s) 612 include one or more audio producing devices. In some implementations, the one or more output device(s) 612 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 612 may additionally or alternatively be configured to generate haptics.

In some implementations, the one or more image sensor systems 614 are configured to obtain image data that corresponds to at least a portion of a physical environment. For example, the one or more image sensor systems 614 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 614 further include illumination sources that emit light, such as a flash. In various implementations, the one or more image sensor systems 614 further include an on-camera image signal processor (ISP) configured to execute a plurality of processing operations on the image data.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 includes a non-transitory computer readable storage medium.

In some implementations, the memory 620 or the non-transitory computer readable storage medium of the memory 620 stores an optional operating system 630 and one or more instruction set(s) 640. The operating system 630 includes procedures for handling various basic system services and for performing hardware dependent tasks. In some implementations, the instruction set(s) 640 include executable software defined by binary information stored in the form of an electrical charge. In some implementations, the instruction set(s) 640 are software that is executable by the one or more processing units 602 to carry out one or more of the techniques described herein.

The instruction set(s) 640 includes a content instruction set 642, a 3D position/size estimation instruction set 644, and a filtering instruction set 646. The instruction set(s) 640 may be embodied as a single software executable or multiple software executables.

In some implementations, the content instruction set 642 is executable by the processing unit(s) 602 to provide and/or track content for display on a device. The content instruction set 642 may be configured to monitor and track the content over time (e.g., during an experience) and/or to present a view (e.g., one or more frames) of an XR environment on a display (e.g., display virtual content, a portion of a physical environment or a representation thereof, etc.).

In some implementations, the 3D position/size estimation instruction set 644 is executable by the processing unit(s) 602 to determine a 3D position and/or size of an object (e.g., based on a distance from the device displaying the XR environment to the object). In some implementations, the 3D position/size estimation instruction set 644 may be configured to determine a 3D position and/or size of an object based on a depth sensor signal that provides distance-to-object info, an image sensor signal that provides images interpreted (e.g., by a machine learning model) to identify image portions corresponding to the object, and/or a head/device pose signal.

In some implementations, the filtering instruction set 646 is executable by the processing unit(s) 602 to filter a depth data signal. In some implementations, the filtering instruction set 646 may be configured to filter depth data, and using the filtered depth to determine an object's 3D location, and then adaptively filtering that 3D location based on a velocity (e.g., how quickly the object is moving and/or the person/device is moving relative to the object). For example, an adaptive low pass filters may adjusts a cutoff frequency based on the velocity. In some implementations, the filtering instruction set 646 may be configured to one more filters including a distance filter (e.g., reduce noise in the depth signal), a size filter (e.g., filter 2D box size), and an adaptive position filter (e.g., filter 3D location of the object based on velocity).

Although the instruction set(s) 640 are shown as residing on a single device, it should be understood that in other implementations, any combination of the elements may be located in separate computing devices. Moreover, FIG. 6 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 7:
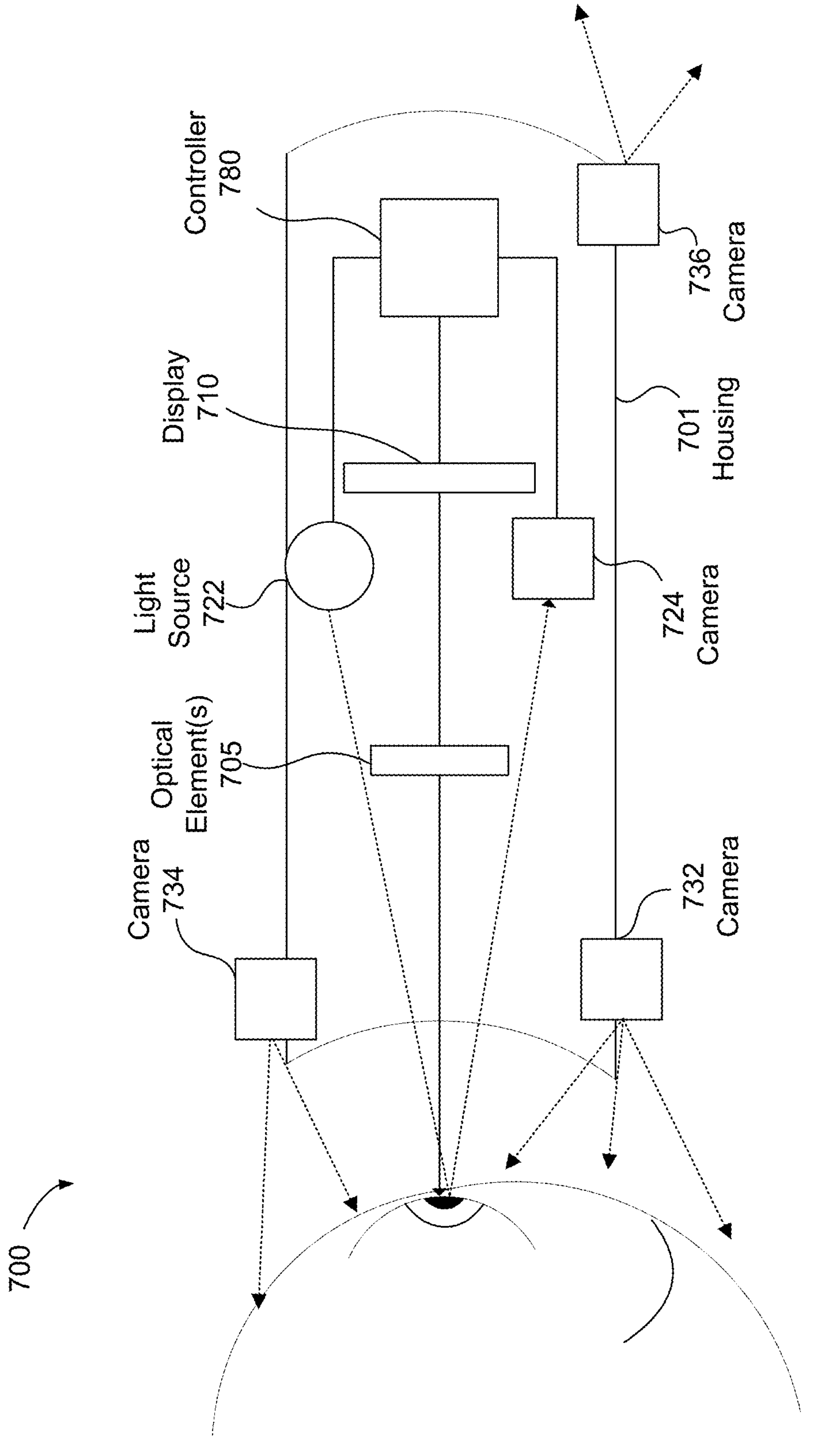
FIG. 7 is a block diagram of an exemplary head-mounted device in accordance with some implementations.

FIG. 7 illustrates a block diagram of an exemplary head-mounted device 700 in accordance with some implementations. The head-mounted device 700 includes a housing 701 (or enclosure) that houses various components of the head-mounted device 700. The housing 701 includes (or is coupled to) an eye pad (not shown) disposed at a proximal (to the user 102) end of the housing 701. In various implementations, the eye pad is a plastic or rubber piece that comfortably and snugly keeps the head-mounted device 700 in the proper position on the face of the user 102 (e.g., surrounding the eye of the user 102).

The housing 701 houses a display 710 that displays an image, emitting light towards or onto the eye of a user 102. In various implementations, the display 710 emits the light through an eyepiece having one or more optical elements 705 that refracts the light emitted by the display 710, making the display appear to the user 102 to be at a virtual distance farther than the actual distance from the eye to the display 710. For example, optical element(s) 705 may include one or more lenses, a waveguide, other diffraction optical elements (DOE), and the like. For the user 102 to be able to focus on the display 710, in various implementations, the virtual distance is at least greater than a minimum focal distance of the eye (e.g., 7 cm). Further, in order to provide a better user experience, in various implementations, the virtual distance is greater than 1 meter.

The housing 701 also houses a tracking system including one or more light sources 722, camera 724, camera 732, camera 734, camera 736, and a controller 780. The one or more light sources 722 emit light onto the eye of the user 102 that reflects as a light pattern (e.g., a circle of glints) that may be detected by the camera 724. Based on the light pattern, the controller 780 may determine an eye tracking characteristic of the user 102. For example, the controller 780 may determine a gaze direction and/or a blinking state (eyes open or eyes closed) of the user 102. As another example, the controller 780 may determine a pupil center, a pupil size, or a point of regard. Thus, in various implementations, the light is emitted by the one or more light sources 722, reflects off the eye of the user 102, and is detected by the camera 724. In various implementations, the light from the eye of the user 102 is reflected off a hot mirror or passed through an eyepiece before reaching the camera 724.

The display 710 emits light in a first wavelength range and the one or more light sources 722 emit light in a second wavelength range. Similarly, the camera 724 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 102 selects an option on the display 710 by looking at it), provide foveated rendering (e.g., present a higher resolution in an area of the display 710 the user 102 is looking at and a lower resolution elsewhere on the display 710), or correct distortions (e.g., for images to be provided on the display 710).

In various implementations, the one or more light sources 722 emit light towards the eye of the user 102 which reflects in the form of a plurality of glints.

In various implementations, the camera 724 is a frame/shutter-based camera that, at a particular point in time or multiple points in time at a frame rate, generates an image of the eye of the user 102. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 724 is an event camera including a plurality of light sensors (e.g., a matrix of light sensors) at a plurality of respective locations that, in response to a particular light sensor detecting a change in intensity of light, generates an event message indicating a particular location of the particular light sensor.

In various implementations, the camera 732, camera 734, and camera 736 are frame/shutter-based cameras that, at a particular point in time or multiple points in time at a frame rate, may generate an image of the face of the user 102 or capture an external physical environment. For example, camera 732 captures images of the user's face below the eyes, camera 734 captures images of the user's face above the eyes, and camera 736 captures the external environment of the user (e.g., environment 100 of FIG. 1). The images captured by camera 732, camera 734, and camera 736 may include light intensity images (e.g., RGB) and/or depth image data (e.g., Time-of-Flight, infrared, etc.).

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:

at a device having a processor and one or more sensors:
- obtaining sensor data for a sequence of frames by the one or more sensors in a physical environment, wherein the physical environment comprises an object, the sensor data comprising image data, depth data, device pose data, or a combination thereof, for each frame of the sequence of frames;
- determining a representation of the object; and
- determining three-dimensional (3D) positions and size estimates of the representation of the object for each frame of the sequence of frames, wherein:
  - for each frame of the sequence of frames that includes image data and depth data, (i) the 3D position of the representation of the object is determined based on the device pose data and the depth data for each corresponding frame, and (ii) the size estimate of the representation of the object is determined based on the image data and the depth data; and
  - for each frame of the sequence of frames that includes image data and excludes depth data, (i) the size estimate of the representation of the object is determined based on a prior size estimate from a prior frame of the sequence of frames that included image data and depth data, and (ii) the 3D position of the representation of the object is determined based on the size estimate of the representation of the object and a portion of the image data.

2. The method of claim 1, wherein, for each frame of the sequence of frames that includes image data and excludes depth data, the 3D position of the representation of the object is further based on a relationship between object size and image size.

3. The method of claim 1, wherein determining the 3D positions and the size estimates of the representation of the object for each frame of the sequence of frames that includes image data and excludes depth data is based on an estimation of mapping a coordinate of a point in a 3D space associated with the object and a projection of the point to an image plane of a two-dimensional (2D) image.

4. The method of claim 1, wherein the sensor data comprises image data and depth data, wherein the image data is captured at a first rate and the depth data is captured at a second rate different than the first rate.

5. The method of claim 1, wherein the object is in motion for at least a portion of frames of the sequence of frames.

6. The method of claim 1, wherein determining the 3D position and the size estimate of the representation of the object is based on a pose of the device.

7. The method of claim 1, further comprising:

determining a change in a position of a viewpoint of the device during the sequence of frames; and adjusting the 3D position and the size estimate of the representation of the object based on the determined change in the position of the viewpoint.

8. The method of claim 1, wherein the representation of the object comprises a two-dimensional (2D) rectangle in a 3D coordinate space.

9. The method of claim 1, further comprising:

presenting a view of an extended reality (XR) environment on a display, wherein the view of the XR environment comprises virtual content and at least a portion of the physical environment, wherein the portion of the physical environment includes the object.

10. The method of claim 9, wherein the virtual content is adjusted based on the determined 3D position and the size estimate of the representation of the object.

11. The method of claim 1, wherein the image data is determined from an image sensor signal based on a machine learning model configured to identify image portions corresponding to the object.

12. The method of claim 1, wherein the device comprises a head-mounted device (HMD).

13. A device comprising:

one or more sensors;

a non-transitory computer-readable storage medium; and one or more processors coupled to the non-transitory computer-readable storage medium, wherein the non-transitory computer-readable storage medium comprises program instructions that, when executed on the one or more processors, cause the one or more processors to perform operations comprising:

obtaining sensor data for a sequence of frames by the one or more sensors in a physical environment, wherein the physical environment comprises an object, the sensor data comprising image data, depth data, device pose data, or a combination thereof, for each frame of the sequence of frames;

determining a representation of the object; and determining three-dimensional (3D) positions and size estimates of the representation of the object for each frame of the sequence of frames, wherein:

for each frame of the sequence of frames that includes image data and depth data, (i) the 3D position of the representation of the object is determined based on the device pose data and the depth data for each corresponding frame, and (ii) the size estimate of the representation of the object is determined based on the image data and the depth data; and for each frame of the sequence of frames that includes image data and excludes depth data, (i) the size estimate of the representation of the object is determined based on a prior size estimate from a prior frame of the sequence of frames that included image data and depth data, and (ii) the 3D position of the representation of the object is determined based on the size estimate of the representation of the object and a portion of the image data.

14. The device of claim 13, wherein, for each frame of the sequence of frames that includes image data and excludes depth data, the 3D position of the representation of the object is further based on a relationship between object size and image size.

15. The device of claim 13, wherein determining the 3D positions and the size estimates of the representation of the object for each frame of the sequence of frames that includes image data and excludes depth data is based on an estimation of mapping a coordinate of a point in a 3D space associated with the object and a projection of the point to an image plane of a two-dimensional (2D) image.

16. The device of claim 13, wherein the sensor data comprises image data and depth data, wherein the image data is captured at a first rate and the depth data is captured at a second rate different than the first rate.

17. The device of claim 13, wherein the object is in motion for at least a portion of frames of the sequence of frames.

18. The device of claim 13, wherein determining the 3D position and the size estimate of the representation of the object is based on a pose of the device.

19. The device of claim 13, wherein the non-transitory computer-readable storage medium comprises program instructions that, when executed on the one or more processors, further cause the one or more processors to perform operations comprising determining a change in a position of a viewpoint of the device during the sequence of frames; and adjusting the 3D position and the size estimate of the representation of the object based on the determined change in the position of the viewpoint.

20. A non-transitory computer-readable storage medium, storing program instructions executable on a device to perform operations comprising:

obtaining sensor data for a sequence of frames by the one or more sensors in a physical environment, wherein the physical environment comprises an object, the sensor data comprising image data, depth data, device pose data, or a combination thereof, for each frame of the sequence of frames;

determining a representation of the object; and determining three-dimensional (3D) positions and size estimates of the representation of the object for each frame of the sequence of frames, wherein:

for each frame of the sequence of frames that includes image data and depth data, (i) the 3D position of the representation of the object is determined based on the device pose data and the depth data for each corresponding frame, and (ii) the size estimate of the representation of the object is determined based on the image data and the depth data; and for each frame of the sequence of frames that includes image data and excludes depth data, (i) the size estimate of the representation of the object is determined based on a prior size estimate from a prior frame of the sequence of frames that included image data and depth data, and (ii) the 3D position of the representation of the object is determined based on the size estimate of the representation of the object and a portion of the image data.

* * * * *